US008112555B2

(12) United States Patent
Anand et al.

(10) Patent No.: US 8,112,555 B2
(45) Date of Patent: Feb. 7, 2012

(54) PERIPHERAL ADAPTER INTERRUPT FREQUENCY CONTROL BY ESTIMATING PROCESSOR LOAD AT THE PERIPHERAL ADAPTER

(75) Inventors: Vaijayanthimala K. Anand, Austin, TX (US); Janice Marie Girouard, Austin, TX (US); Emily Jane Ratliff, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/550,309

(22) Filed: Aug. 28, 2009

(65) Prior Publication Data

US 2010/0274938 A1    Oct. 28, 2010

Related U.S. Application Data

(63) Continuation of application No. 10/948,409, filed on Sep. 23, 2004, now Pat. No. 7,634,589.

(51) Int. Cl.
 *G06F 3/00* (2006.01)
 *G06F 5/00* (2006.01)

(52) U.S. Cl. .......................................... 710/15; 710/52
(58) Field of Classification Search ...................... 710/15
 See application file for complete search history.

(56) References Cited

U.S. PATENT DOCUMENTS

| | | | |
|---|---|---|---|
| 5,668,951 A * | 9/1997 | Jain et al. ....................... 709/235 |
| 6,065,089 A * | 5/2000 | Hickerson et al. ............. 710/266 |
| 6,189,067 B1 * | 2/2001 | Lowe et al. .................... 710/260 |
| 6,192,440 B1 | 2/2001 | Lowe et al. |
| 6,266,732 B1 | 7/2001 | Chen et al. |
| 6,314,463 B1 | 11/2001 | Abbott et al. |
| 6,988,156 B2 | 1/2006 | Musumeci |
| 2003/0200369 A1 | 10/2003 | Musumeci |
| 2004/0117534 A1 | 6/2004 | Parry et al. |
| 2004/0236875 A1 * | 11/2004 | Jinzaki ............................ 710/15 |
| 2005/0188074 A1 | 8/2005 | Voruganti et al. |
| 2006/0075480 A1 | 4/2006 | Noehring et al. |

OTHER PUBLICATIONS

Office Action in U.S. Appl. No. 10/948,409 dated Mar. 8, 2007.
Final Office Action in U.S. Appl. No. 10/948,409 dated Aug. 15, 2007.
Office Action in U.S. Appl. No. 10/948,409 dated Jan. 8, 2008.
Final Office Action in U.S. Appl. No. 10/948,409 dated Jul. 22, 2008.
Office Action in U.S. Appl. No. 10/948,409 dated Jan. 21, 2009.

* cited by examiner

*Primary Examiner* — Henry Tsai
*Assistant Examiner* — Titus Wong
(74) *Attorney, Agent, or Firm* — Mitch Harris, Atty at Law, LLC; Andrew M. Harris; Matthew W. Baca

(57) ABSTRACT

Interrupt frequency control by estimating processor load in the peripheral adapter provides adaptive interrupt latency to improve performance in a processing system. A mathematical function of the depth of one or more queues of the adapter is compared to its historical value in order to provide an estimate of processor load. The estimated processor load is then used to set a parameter that controls the frequency of an interrupt generator, which may be controlled by setting an interrupt queue depth threshold, packet frequency threshold or interrupt hold-off time value. The mathematical function may be the ratio of the transmit queue depth to the receive queue depth and the historical value may be predetermined, user-settable, obtained during a calibration interval or obtained by taking a long-term average of the mathematical function of the queue depths.

21 Claims, 3 Drawing Sheets

PERIPHERAL ADAPTER INTERRUPT FREQUENCY CONTROL BY ESTIMATING PROCESSOR LOAD AT THE PERIPHERAL ADAPTER

The Present Application is a Continuation of U.S. patent application Ser. No. 10/948,409, filed on Sep. 23, 2004 now U.S. Pat. No. 7,634,589.

BACKGROUND OF THE INVENTION

1. Technical Field

The present invention relates generally to interrupt-driven peripheral devices having input/output (I/O) queues, and more particularly, to a peripheral device that manages its interrupt frequency by estimating processor loading.

2. Description of Related Art

Peripheral devices connected to a processing system typically interrupt one or more processors in order to signal the presence of receive data or absence of transmit data in device queues. In the past, an interrupt was generally generated upon receipt of a complete packet or when a complete packet had been transmitted. When an interrupt is processed, the processes triggered by the interrupt generally transfer all of the data that is available in the receive queue and likewise flush the system transmit queues by transferring transmit data to the adapter. However, when the system is experiencing a large volume of traffic, the resulting increased frequency of the interrupts received can reduce system efficiency, compounding any backlog of processing activity. Network adapters in particular have a high traffic level in today's server system and the processing overhead for handling packets can be very high, especially in a web server where the packets require a response and are not merely forwarded after minimal processing, such as in routing applications.

To solve the above-described problem, a technique known as "interrupt coalescing" has been introduced, which lessens the frequency of interrupts directed at the processor(s). Rather than interrupt at each packet transfer, present-day adapters accumulate data in queues that can accommodate multiple packets and interrupts are triggered at a lower frequency. In particular, present network adapters typically accumulate a large amount of data before interrupting the processor managing data transfer between the adapter and the host system. In part, a large data size associated with each interrupt is provided due to the overhead associated with each interrupt.

Several interrupt timing schemes have been implemented for interrupt coalescing. Three primary techniques are presently used. The first technique times a hold-off time interval from receipt of the first new packet after the last interrupt. Upon expiration of the timer, the processor is interrupted. The first technique provides adaptability only in that an interrupt will be held off for the instantaneous time between the last interrupt and completion of the first packet plus the predetermined time. If the processor is not busy, the first technique introduces undesired latency. A second technique is to interrupt after a predetermined number of packets has been received (queue depth threshold). The second technique may generate an even higher latency, as no interrupt is generated until the required number of packets is received. A third technique generates an interrupt if the frequency of packets receives drops below a predetermined threshold (received packet frequency threshold).

Each of the above-described techniques reduces interrupt overhead in the system. However, none of the techniques takes into account the processor load. Therefore, undesirable latency can be introduced when the processor is not busy and the design values such as the timer length for the first technique above, the packet count for the second technique above and the threshold value for the third technique above may not be the ideal values for high load conditions at the processor, but merely a compromise between latency and reduced interrupt overhead.

Peripheral devices other than network adapters also introduce overhead when interrupting on a per-packet basis, and therefore interrupt coalescing techniques have also been used in storage systems adapters, bus adapters such as Fiber Channel, IEEE 1394 and Universal Serial Bus (USB) adapters, with the associated problems described above.

Therefore, it would be desirable to provide a method and apparatus for managing peripheral device adapter interrupts in a processing system that adapts to processor loading in order to reduce interrupt overhead while maintaining low latency.

BRIEF SUMMARY OF THE INVENTION

The objectives of providing for reduced interrupt overhead while maintaining low latency with respect to a peripheral device adapter is provided in a method and apparatus.

The apparatus is a peripheral device adapter that adapts its interrupt frequency in conformity with a current queue depth of the adapter I/O queues, thereby providing an interrupt frequency that is dependent on an estimate of processor load. The ratio of the depth of the transmit queue to the depth of the receive queue can be used to provide an estimate of available processing time, as a large relative transmit queue depth indicates that the processor is keeping up with processing requirements, but a small relative transmit queue size is indicative of a processor that is lagging behind processing requirements. A historical value of the transmit/receive ratio can be maintained as a long-term average, may be set in a calibration interval, may be set by a user (system administrator) or may be a predetermined value. The divergence between the historical ratio and the instantaneous ratio can be used to set parameters for interrupt coalescing, such as an interrupt hold-off time, a queue depth threshold or a received packet frequency threshold.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DETAILED DESCRIPTION OF THE INVENTION

Figure 1:
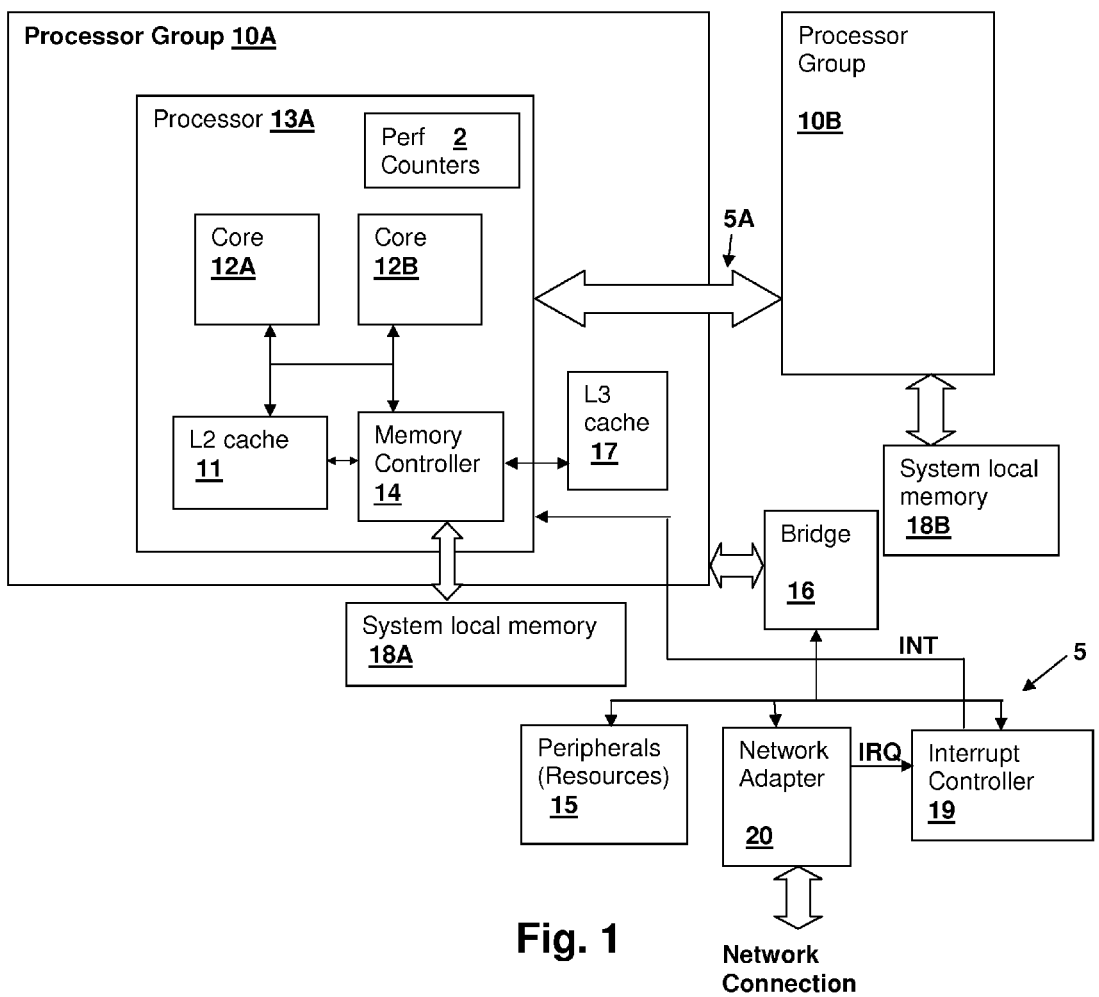
FIG. 1 is a block diagram of a computing system in accordance with an embodiment of the present invention.

With reference now to the figures, and in particular with reference to FIG. 1, there is depicted a block diagram of a processing system in accordance with an embodiment of the present invention. It should be understood that the depicted embodiment is not intended to be limiting, but only exemplary of the type of processing system to which the methods and structures of the present invention may be applied. The system includes a processor group 10A having two cores 12A and 12B and coupled to another processor group 10B by a high-speed dedicated interface 5A. Processor group 10A is connected to peripherals (hardware resources) 15 via a bridge 16. Cores 12A and 12B provide instruction execution and operation on data values for general-purpose processing functions, which include the processing of network data transfers between a network connection and processor group 10A via a network adapter 20. In particular, processor group 10A may be included in a web server providing web page files and other program code and data in response to web requests received over the network connection. Performance counters 2 are included to provide an operating system with information about processor load and other metrics within processor group 10A.

Processor group 10A also includes an L3 cache unit 17, a shared L2 cache unit 11 and a memory controller 14. Each processor group 10A, 10B is coupled to separate associated local system local memory 18A, 18B and can access any system memory via the various interconnections. However, to maintain low latencies, program instructions for execution by processor 13A are generally stored in system local memory 18A so that values from system local memory can be loaded into caches 11 and 17 as quickly as possible. Other global system memory may be coupled external to bridge 16 for symmetrical access by all processor groups.

PCI bus 5 couples the various peripherals 15, as well as an interrupt controller 19 to bridge 16. Bridge 16 is also coupled by bus 5 to network adapter 20, which includes circuits and implements methodologies in accordance with embodiments of the present invention. Interrupt controller 19 provides interrupt signals INT to processor group 10A and interrupts one of cores 12A or 12B within processor group 10A in response to an interrupt request signal IRQ provided by network adapter 20.

Within system local memory 18A and or 18B, a virtual machine monitor program, or "hypervisor" provides support for execution of multiple virtual machines (VMs) or "partitions" that each provide an execution environment for an operating system and a number of "guest" programs (applications and services executed by an operating system and running in the associated VM). However, the techniques of the present invention are equally applicable to single partition systems including uniprocessor systems and the illustrated system is provided only as an example of the technology to which the present invention may be applied.

The present invention concerns the operation of network adapter 20 and in particular a mechanism for managing a frequency of interrupts issued by network adapter 20 to processor group 10A. Network adapter 20 may be an Ethernet adapter, an ATM interface or other network interface. In general, the present invention applies to any peripheral adapter that coalesces interrupts and therefore the illustration with respect to network adapter 20 should not be construed as limiting the invention to network packet processing. Therefore, the term "packet" as used herein should be understood to apply to a single unit of data with respect to the peripheral device in which the invention is embodied and terms such as "block" or "sector" for other types of peripheral device adapters such as storage adapters should be understood to be encompassed by the term "packet". Also, the term "frequency" as applied to the interrupt control of the present invention should not be construed as meaning absolute frequency of a fixed period, but rather a relative and average frequency at which interrupts occur, as may be triggered at asynchronous, synchronous or quasi-synchronous intervals by network adapter 20.

Figure 2:
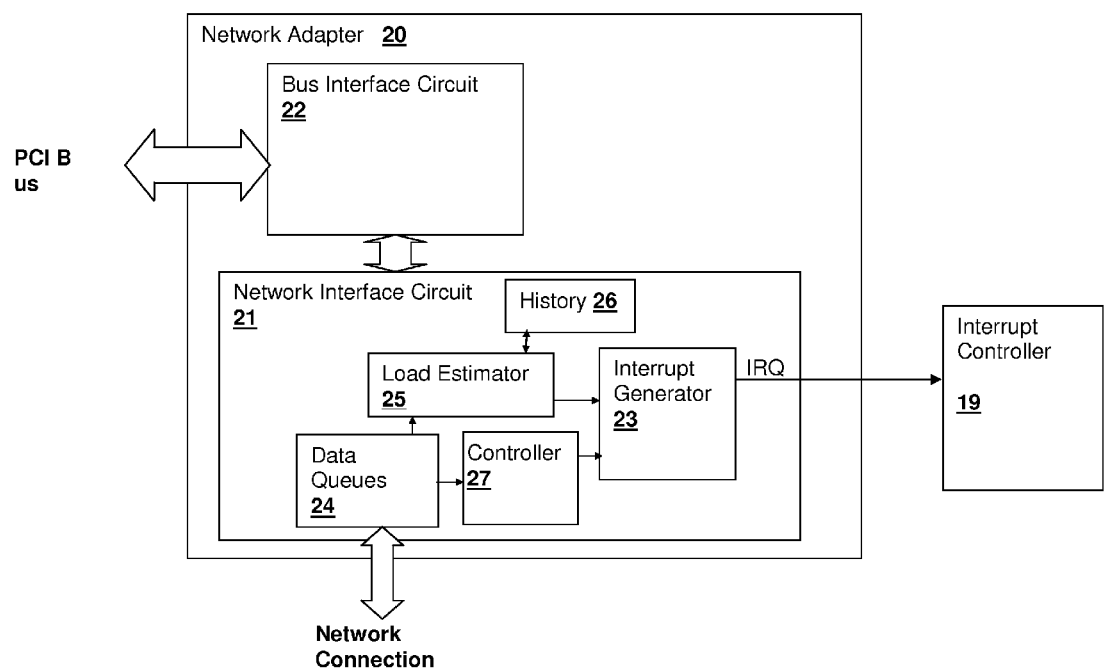
FIG. 2 is a block diagram showing details of network adapter 20 of FIG. 1.

Referring now to FIG. 2, details of network adapter 20 and the configuration thereof are illustrated. Network adapter 20 includes a network interface circuit 21 that connects to the network connection and a bus interface circuit 22 that couples the network interface circuit 21 to external PCI bus 5. Network adapter provides an interrupt request signal IRQ to interrupt controller 19 and manages the frequency of the IRQ assertions in accordance with an embodiment of the present invention.

Within network interface circuit 21 a set of data queues 24 is managed by a controller 27 which may be a microprocessor or microcontroller or dedicated logic circuit that handles the transfer of data into and out of data queues 24 to bus interface circuit 22 and further provides an interrupt generator 23 with a signal indicating when to interrupt external processor group 10A. The present invention includes further input to interrupt generator 23 so that the frequency of IRQ assertions can be tailored to the current processor load. In network-centric systems where processor group 10A is being loaded substantially with network-associated tasks, the relative depths of data queues 24 provides an indication of how busy processor group 10A is, and therefore whether increased interrupt frequency will tend to increase or decrease system performance.

When processor group 10A is busy processing network requests, the transmit data queue within data queues 24 will tend to starve, while the receive data queue will tend to fill up. It is under this condition that traditional interrupt coalescing methods can cause a downward spiral in performance, as the frequency of interrupts to the processor handling the network packets will be increased in order to attempt to keep up with the demand.

In the present invention, rather than rely solely on the frequency of packets received, the absolute depth of the receive queue, or the expiration of an interrupt time period, the present invention computes an estimate of processor load and reduces the relative interrupt frequency in conformity with the processor load estimate. A load estimator 25, which may in practice be an algorithm executed within controller 27, uses the relative instantaneous depths of the transmit and receive queues within data queues 24 to compute a ratio of transmit to receive queue depth. The transmit/receive queue depth ratio will drop as processor group 10A becomes busy trying to accommodate network requests and therefore provides a good metric of the processor load. Other metrics may be used depending on system conditions such as observing the transmit queue depth alone. However, the ratiometric comparison yields a better estimate of how well the processor is handling the network traffic load. When the receive queue is filling while the transmit queue is starved, the processor is likely busy handling network requests, whereas if both queues are relatively empty, the overall network traffic is likely to be low.

Load estimator 25 therefore provides a divider or other means for generating a ratio of transmit queue depth to receive queue depth and providing a result to interrupt generator 23, which may also in practice be an algorithm within controller 27. The result controls the frequency of interrupts generated by interrupt generator 23 and in the present embodiment is scaled by a historical value provided by a history unit 26 that further refines the interrupt frequency control result. History unit 26 determines a historical value of the transmit/receive queue depth ratio and load estimator 25 further divides the historical ratio by the instantaneous ratio computed as described above. The result can then be mapped in a linear (or alternatively a non-linear) function to control interrupt frequency by adjusting a parameter of the interrupt coalescing technique that is employed. The linear result may be used, for example, to control a timer value that times the interval from the first received packet after the last interrupt until the next interrupt, to control the receive queue depth at which an interrupt is issued, or to adjust a packet-frequency interrupt threshold.

The linear mapping maps the variation of the instantaneous ratio of the transmit to receive queue as normalized by the historical value to a parameter that controls the particular coalescing method employed by interrupt generator 23. For example, if the receive queue depth is the coalescing technique trigger and test results show that the interrupt overhead load on processor group 10A is effectively controlled by varying the receive queue depth interrupt threshold from a depth of Min to Max, then the following formulas may be employed:

Ratio=(Historical *Tx/Rx* ratio)/(Current *Tx/Rx* ratio)

where Tx=Transmit queue and Rx=Receive queue depth.

Receive Queue Interrupt Threshold=Min+(Max−Min)×(Ratio−*K*):Ratio>*K*Min:Ratio<=*K*

Min:Ratio<=*K* where Min=minimum receive queue depth interrupt threshold and
Max=maximum receive queue depth interrupt threshold and K is a predetermined threshold for the Ratio value.

The above formulas provide that the interrupt parameter (in this case the Receive Queue Interrupt Threshold) will never fall below the Min value, even if Ratio falls below a predetermined threshold for the linear mapping.

Similarly, a timed interrupt scheme can use the same formula given above. For example if the interrupt time from the first packet received ranges from Min to Max in order to effectively control the interrupt overhead processor load, then the timer value can be computed using the same formula, where the Min and Max values are expressed as interrupt delay times.

Finally, if the packet frequency of packets received by network adapter 20 is the control parameter and the interrupt overhead processor load can be effectively controlled by a threshold range of Min to Max in packets/sec, then the same formula may be employed to determine the packet frequency interrupt threshold.

The historical value determined by history unit 26 may be provided in several ways, including using the full range of values for the minimum Tx queue depth and maximum Rx queue depth ever encountered as the historical ratio. The simplest is a pre-set value that is determined a priori via measurement of a particular application and encoded in the network interface circuit. An alternative is to provide a user-settable register that may be set by a system administrator at set-up time, so that the interrupt frequency can be tailored to a specific application. Two other alternatives implement an averaging algorithm or provide an averaging circuit within history unit 26. A calibration interval may be initiated during which the instantaneous ratio of transmit to receive queue depths is averaged and then stored at the end of the calibration interval. The resulting averaged ratio is then used as the historical value for comparison with the instantaneous ratio during operation. Finally, history unit 26 may perform a long-term average over a predetermined interval, permitting the historical value to adapt to changes in operating conditions without requiring a separate calibration interval.

It should be further understood that the above examples are not an exhaustive list of interrupt frequency control techniques. For example, interrupts may also be generated as a function of transmit queue depth and so the interrupt coalescing parameter adjustment of the present invention may also be applied to scale the frequency of interrupts generated as a function of transmit queue depth as well.

Figure 3:
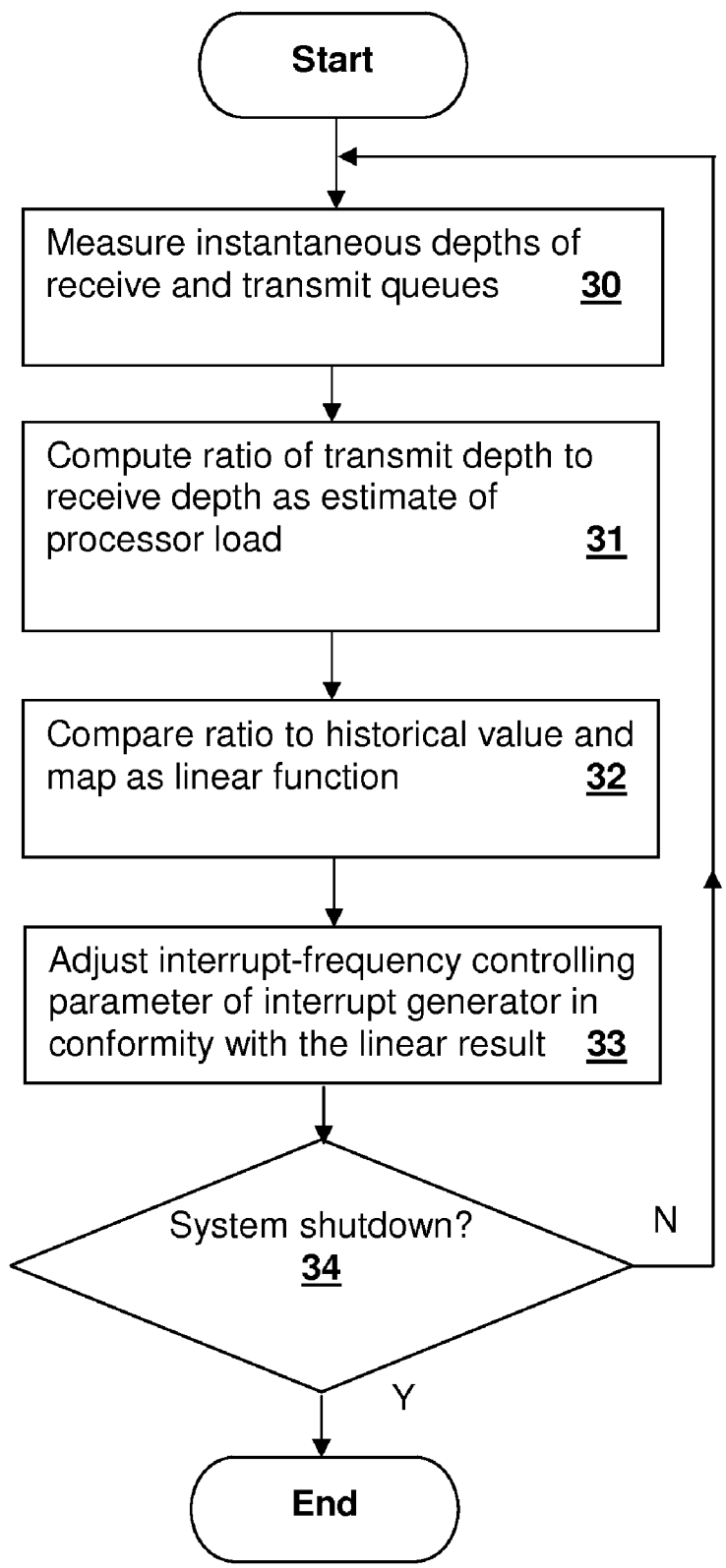
FIG. 3 is a flowchart depicting a method in accordance with an embodiment of the present invention.

Referring now to FIG. 3, a method in accordance with an embodiment of the invention is depicted. First, the instantaneous depths of the receive and transmit queues are measured (step 30). Next, a ratio of transmit queue depth to receive queue depth is computed as an estimate of processor load (step 31). The computed ratio is then compared to a historical value (which may be by computing another ratio) and the result is mapped as a linear function (step 32). Finally the interrupt-frequency controlling parameter of the interrupt generator is adjusted in conformity with the linear result (step 33). The process repeats until the system is shut down (decision 34).

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A method of controlling interrupt frequency from a peripheral adapter in a processing system, the method comprising:
   first determining an amount of transmission data present in a transmit queue of the peripheral adapter, wherein the transmit queue holds data for transmission to one or more peripheral connections;
   second determining an amount of received data present in a receive queue of the peripheral adapter, wherein the receive queue holds data received from the one or more peripheral connections;
   computing a current estimate of processor load from the amount of transmission data and the amount of received data; and
   adjusting the interrupt frequency in conformity with the computed current estimate of processor load.

2. The method of claim 1, wherein said peripheral adapter is a network adapter and wherein the current estimate of processor load is an estimate of a network packet processing backlog of a processor.

3. The method of claim 1, wherein the computing a current estimate of processor load comprises:
   computing a ratio of the amount of transmission data to the amount of received data; and
   comparing a current value of the ratio to a historical value for the ratio to obtain the current estimate of processor load.

4. The method of claim 3, wherein the comparing comprises computing a second ratio of the current value of the ratio to the historical value.

5. The method of claim 3, further comprising:
   receiving a user input; and
   setting the historical value in conformity with the user input.

6. The method of claim 3, further comprising computing the historical value as a long-term average of the ratio.

7. The method of claim 3, further comprising:
   initiating a calibration interval; and computing the historical value during the calibration interval as an average of the ratio.

8. The method of claim 1, wherein the adjusting comprises adjusting a time interval and wherein the method further comprises:

in response to receipt of a first packet after a last interrupt, waiting a time corresponding to the time interval; and generating a next interrupt in response to an end of the waiting at expiration of the time interval.

9. The method of claim 1, wherein the adjusting comprises adjusting a receive queue depth threshold and wherein the method further comprises:

determining whether or not said receive queue depth exceeds the receive queue depth threshold, and in response to determining that the receive queue depth exceeds the receive queue depth threshold, generating an interrupt.

10. The method of claim 1, wherein the adjusting comprises adjusting a packet frequency threshold and wherein the method further comprises:

measuring a frequency of packets received by the peripheral adapter;

determining whether or not the frequency exceeds the packet frequency threshold; and in response to determining that the frequency exceeds the packet frequency threshold, generating an interrupt.

11. An interface circuit for receiving a peripheral connection, said interface circuit comprising:

an interrupt output for providing an interrupt to an external processor;

an interrupt generator coupled to said interrupt output for generating said interrupt;

a receive data queue for storing data received by the peripheral connection;

a transmit data queue for storing data for transmission to the peripheral connection; and a control logic having an output coupled to said interrupt generator for controlling a frequency of interrupts generated by said interrupt generator and including a load estimator for computing an estimate of a current processing load of the external processor from an amount of data in the receive data queue and another amount of data in the transmit data queue, and wherein the control logic controls an interrupt frequency of the interrupt generator in conformity with an output of the load estimator.

12. The interface circuit of claim 11, wherein the peripheral connection is a network connection and wherein said estimate of current processing load is an estimate of a network packet processing backlog of said external processor.

13. The interface circuit of claim 11, wherein the load estimator comprises logic for computing a ratio of the amount of transmission data to the amount of received data and comparing a current value of the ratio to a historical value for the ratio to obtain the current estimate of processor load.

14. The interface circuit of claim 13, wherein the load estimator computes a second ratio of the current value of the ratio to the historical value to compare the current value of the ratio to the historical value of the ratio.

15. The interface circuit of claim 13, wherein said control logic further comprises a register for receiving said historical value whereby said historical value is set by said external processor in conformity with a user input.

16. The interface circuit of claim 13, wherein said control logic further comprises an averaging circuit for computing said historical value as a long-term average of said instantaneous mathematical function of said one or more depths.

17. The interface circuit of claim 13, wherein said control logic further comprises logic for initiating a calibration interval, and wherein said control logic computes said historical value during said calibration interval as a average of said instantaneous mathematical function of said one or more depths.

18. The interface circuit of claim 11, wherein said interrupt generator comprises an interrupt timer that generates said interrupt in response to receipt of a first packet from said peripheral connection occurring after a last interrupt and after a time corresponding to expiration of an interrupt time interval, and wherein said control logic sets said interrupt time interval in conformity with said estimate of current processing load.

19. The interface circuit of claim 11, wherein said interrupt generator generates said interrupt in response to the amount of data in the receive queue exceeding a queue depth threshold, and wherein said control logic sets said queue depth threshold in conformity with said estimate of processor load.

20. The interface circuit of claim 11, wherein said interrupt generator measures a frequency of packets received from said peripheral connection and generates said interrupt in response to said reception frequency exceeding a packet frequency threshold, and wherein said control logic sets said packet frequency threshold in conformity with said estimate of processor load.

21. A processing system comprising:

a memory for storing program instructions and data;

a processor for executing said program instructions;

an interface for receiving a peripheral connection, wherein said interface is coupled to said processor for transferring packets between said processor and said peripheral connection, and wherein said interface has an interrupt output coupled to said processor for interrupting said processor, an interrupt generator coupled to said interrupt output for generating said interrupt, a transmit data queue for storing data for transmission to the peripheral connection, a receive data queue for storing data received from the peripheral connection, and a control logic having an output coupled to said interrupt generator for controlling a frequency of interrupts generated by said interrupt generator and including a load estimator for computing an estimate of a current processing load of the external processor from an amount of data in the receive data queue and another amount of data in the transmit data queue, and wherein the control logic controls an interrupt frequency of the interrupt generator in conformity with an output of the load estimator.

* * * * *